Sept. 2, 1941.                    L. HARRIS                    2,254,961
                             UNITARY LENS SYSTEM
                      Filed Aug. 21, 1937            3 Sheets-Sheet 1
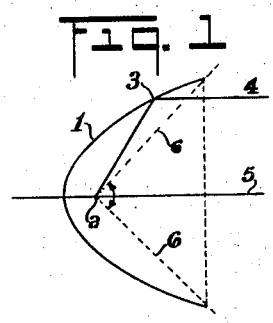
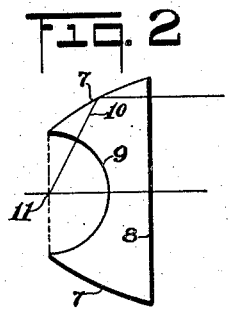
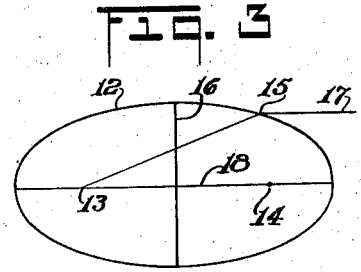
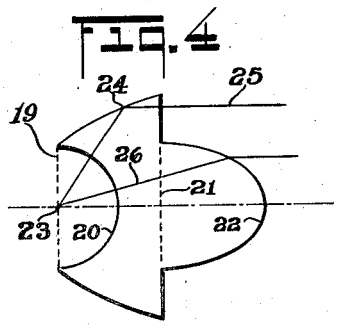
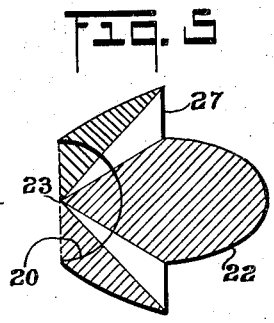
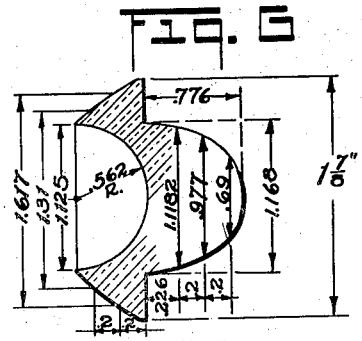
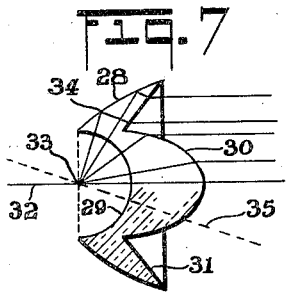
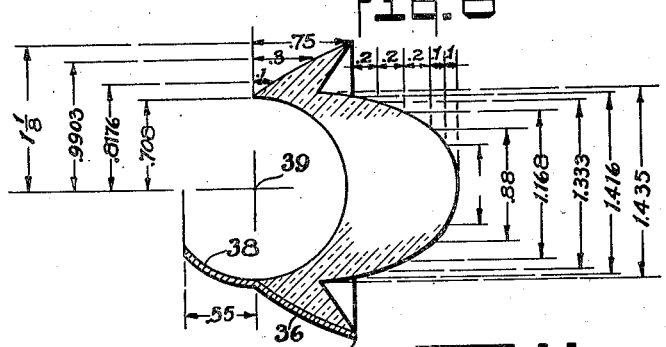
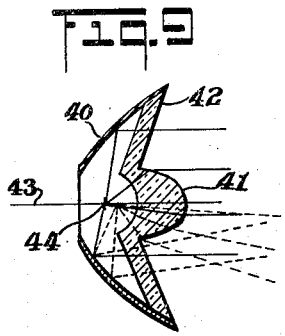
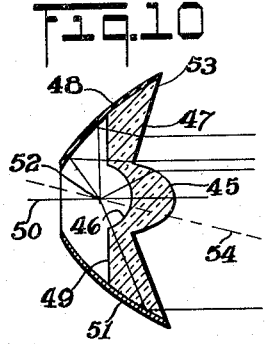
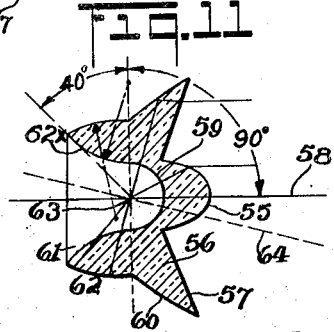
INVENTOR.
Lawrence Harris
BY
ATTORNEY.

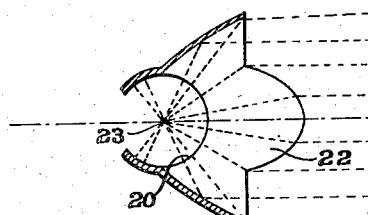
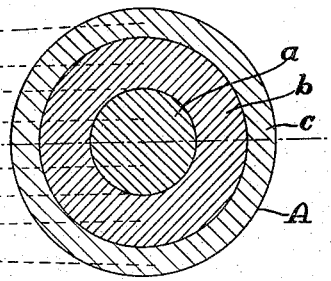
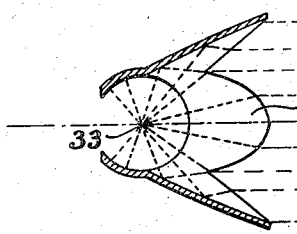
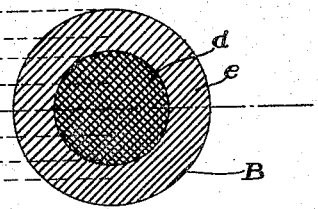
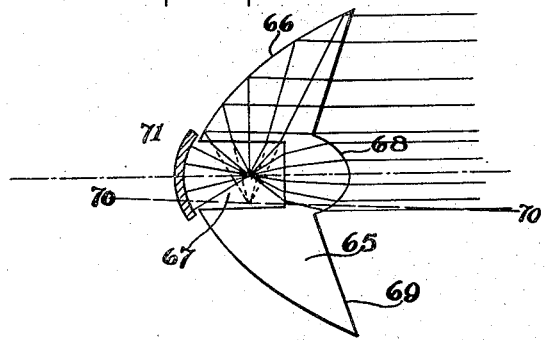
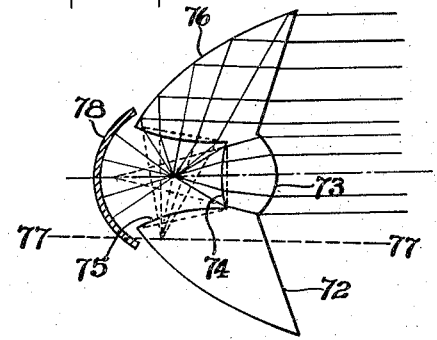
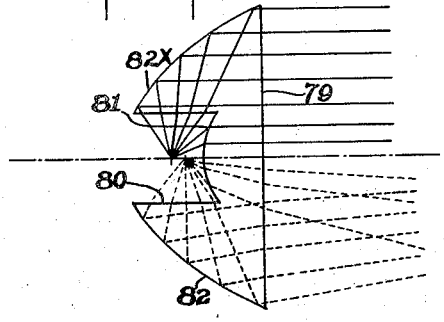
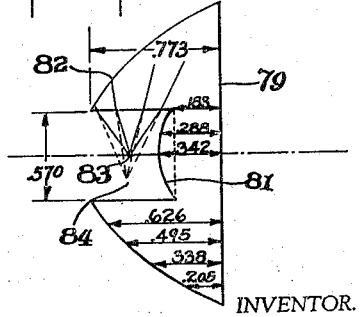

Patented Sept. 2, 1941

2,254,961

UNITED STATES PATENT OFFICE 2,254,961

UNITARY LENS SYSTEM

Lawrence Harris, Brooklyn, N. Y., assignor to George M. Cressaty, New York, N. Y.

Application August 21, 1937, Serial No. 160,312

10 Claims. (Cl. 240—106.1)

This invention is directed to an improvement in a unitary lens system involving a single casting particularly constructed so that all the light rays from the light source are projected in substantial parallel relation without spherical aberration.

A primary object of the invention is the provision of a lens unit which gathers substantially all the light rays from a source into a beam substantially uniform, whether the source is at the focus of the unit or out of focus therewith.

A further object of the invention is the provision of a unitary lens structure constructed to provide one part which reflects the light rays and another part which refracts the light rays, with the parts arranged to project the rays into a uniform light beam evenly distributed throughout the full area to be lighted.

A further object of the invention is the provision of a unitary lens system wherein the unit structure serves as a reflector not only for the forwardly directed rays from the light source but also for the rearwardly directed rays from such source, including provision for the inversion of such rearwardly directed rays into substantially parallel rays to provide the desired light beam and serving to concentrate the light or to diverge certain rays of the light beam to provide a wider and more evenly distributed illuminated area.

A further object of the invention is the provision of a unitary lens structure in which the unit is constructed to provide one part which reflects and another part which refracts the rays from the light source, the surfaces of the part serving to reflect the rays being modified to obtain various patterns of illumination, that is, either symmetrically or asymmetrically depending upon the size and shape of the area to be lighted.

A further object of the invention is the provision of a unitary lens structure constructed with a view to gathering more than 270 degrees of the light rays from the light source without the use of separate metallic reflectors and in a relatively small sized unit, thus maintaining an extremely high efficiency in a lens unit of relatively reduced diameter.

A further object of the invention is to form the wall or walls of the light source receiving well on such a curve or curves as to control the refractive influence of the body of the lens on the rays passing through said well walls to insure that such rays, when reflected from the reflective margin or directed through the central lens system will result in a beam free of spherical aberration.

A further object of the invention is the provision of a lens structure which may be easily and cheaply manufactured and automatically produced and which will give identical performances and results with any hand ground, polished and expensive optical lens system.

The invention is illustrated in the accompanying drawings, in which:

Figure 1 is a diagrammatic view illustrating the use of a conventional parabolic reflector and indicating the degree of uncontrolled light from such light source.

Figure 2 is a similar view showing the lens unit with the surface formed to function as a parabolic reflector.

Figure 3 is a diagrammatic view illustrating more particularly the fundamental properties of the elliptical refracting medium.

Figure 4 is a diagrammatic view illustrating the combination of the parabolic reflector form of Figure 2 with the elliptical lens form of Figure 3.

Figure 5 is a sectional view of a lens unit illustrating more particularly the areas in the unit in which the light rays pass through the unit without striking either the parabolic area or the elliptical area.

Figure 6 is a view similar to Figure 5 with the dimensions of the various sectors marked in inches.

Figure 7 is a view similar to Figure 5 modified to the extent that the diverted or lost rays of the construction shown in Figure 5 are focused in the same manner as the rays from the elliptical or parabolic surface.

Figure 8 is a view of the lens body shown in Figure 7 with the dimensions of the various parts marked in inches.

Figure 9 shows a construction similar to Figure 7 except that the parabolic sector is formed of metal.

Figure 10 is a view similar to Figure 7 modified in the relation of the parabolic surface of the lens and the hemispherical recess in the rear of the lens.

Figure 11 is a view similar to Figure 7 modified in the reflecting surface.

Figure 12 illustrates diagrammatically the type of illumination produced by a lens constructed similar to that shown in Figure 4 and provided with a metallic reflector.

Figure 13 illustrates the type of illumination resulting from the use of a lens of the form shown in Figure 7.

Figure 14 is a more or less diagrammatic view of a modified form of lens.

Figure 15 is a view similar to Figure 14 showing a modified construction with respect thereto.

Figure 16 illustrates a further modification of the type of lens body shown in Figure 14.

Figure 17 is a similar view showing the dimensions marked in inches.

Figure 18:
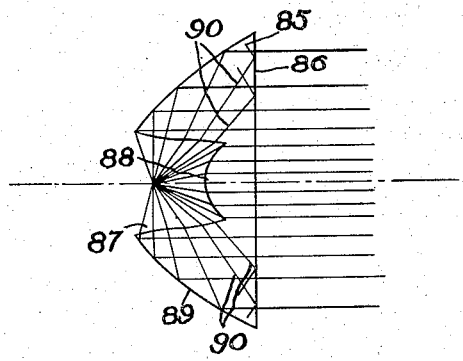
Figure 18 shows a modified form of the lens of Figure 16 with particular regard to the form of the annular wall of the well surface to control refraction of the entering rays.

In order to make clear the optical principles involved in the present lens system, it will be necessary to briefly refer to diagrammatic representations of such optical principles as more particularly illustrated in Figures 1, 2, 3, 4, 5 and 6 of the drawings.

Figure 1 represents the use of an ordinary parabolic reflector. In the use of such a reflector 1 having a focus at 2 a light ray will be reflected at 3 in the direction 4. All rays so reflected will be parallel to the axis 5 of the parabola. However, it will be noted that the rays indicated in dotted lines at 6 and others within the area are uncontrolled by the reflector and, therefore, cannot be focused.

In making use of this principle in connection with a lens body, such body is formed with marginal edges 7 which are of parabolic form, with a forward face 8 forming a straight line between the parabolic ends and with a rear face formed as a sphere 9 with the parabolic segments 7 backed by a metallic reflecting surface. Then a ray of light, as 10, from the focus 11 will be reflected from the parabolic segment and will not be refracted by the surface of the spherical cavity 9 or the plane face 10 as the ray is normal to both these surfaces.

However, in this form it will be noted that the rays of light which pass directly to the exit plane from the hemispherical cavity are still uncontrolled and to provide a remedy for this defect, it was conceived that a block of transparent material to fill the central parabolic section which radiates the uncontrolled light for the surface having a fundamental purpose of elliptical refracting could be utilized. The elliptical refracting is illustrated in Figure 3 wherein the elliptical body 12 has focuses at 13 and 14, with the eccentricity equal to the reciprocal of the index of refraction of the glass used.

With the light source at 13, for example, a ray of light passing out of the lens at 15, where 15 is on the opposite side of the minor axis 16 of the lens with respect to the light source, the refracted ray 17 will be parallel to the major axis 18. Now, by proper choice of the thickness of the parabolic section of the lens, it is possible to combine the parabolic and elliptical sections in such a way, as illustrated in Figure 4, that the diameter 19 of the spherical cavity 20 in the rear of the lens is equal to the minor axis 21 of the elliptical section 22 and the focus of the parabolic section coincides with the focus of the elliptical section, as at 23.

Under these conditions, a ray from 23 impinging on the parabolic section at 24 will be reflected from 24 in the direction 25 while a ray 26 impinging on the elliptical section 22 will be refracted in passing from the elliptical section though undergoing no refraction on entering the lens through the semi-circular surface 20.

The lens shown in Figures 4 and 5 has parabolic margins with a spherical depression or cavity in the rear face, an elliptical projection at the forward face, and a plane margin 27 surrounding the elliptical section. It is quite apparent that a ray of light from the source 23 will undergo refraction when passing directly through the plane surface 27 and will not emerge parallel to the optical axis and hence such light rays will be practically useless for forming the desired beam.

The areas marking the limits of the useful rays of light in connection with the lens projection are shown shaded in Figure 5 and the unshaded portions represent the area in which the rays passing directly therethrough will be lost. To recover and make use of this lost light, the lens of Figure 7 was constructed. Here we have the parabolic margin 28, the spherical cavity 29 in the rear face of the lens, the elliptical projection or lens center 30 on the face of the lens and the annular margins 31 between the elliptical lens center and the forward margin of the parabolic sections. The margins 31 are disposed at an angle to the optical axis 32 with the inclination such that if extended they would pass through the focal point 33 of the lens.

In order that all rays emerging from the unit may be parallel to the optical axis, it is necessary to rotate the axis of the parabola about the focus in such a way that a ray, as 34, impinging on the parabola, will be reflected at an angle to the axis of the lens, so that refraction at the surface 31 will cause the refracted ray to emerge in parallel relation to the axis. The dotted line 35 shows the position of the tilted axis of the parabola. This tilted axis is parallel to the rays reflected from the parabola to the refracting area 31.

As will later appear, it will be apparent by suitable changes in design, it is possible to obtain various types of illumination from these lenses. For instance, by proper choice of angular inclination of the parabola, it is possible to get a spot of light as small as the size of the diameter of the elliptical lens section alone or the beam may be spread in varying degrees. If the axis of the parabola is tilted backward toward the rear of the lens, the light coming from the parabolic ring will be no longer parallel to the axis of the ring but will be inclined away from it. This will provide a divergent beam. Obviously, by suitable changes along the lines indicated, various patterns of illumination, either symmetrical or asymmetrical, may be provided while maintaining the full principles described.

Figure 8 illustrates the type of lens shown in Figure 7 in substantially natural size and with the various dimensions marked in inches. The lower portion of this figure shows a metallic reflector 36 which is of parabolic section at 37 and which, in the section 38, extends rearwardly of the lens proper in spherical formation having its center at the focal point 39. The metallic sections 37 act to support the lens and insure total reflection while the spherical section 38 acts to reflect the rays in rear of the focal point or light source.

Figure 9 is similar to Figure 7 except that the parabolic sector 40 is of metal and the elliptical lens center 41 is held by an annular cone of glass 42 in the form of a ring surrounding the elliptical lens section. This ring 42 is of uniform thickness and, therefore, does not cause any permanent deviation to any ray of light passing through it. For this reason, it is not necessary that the parabolic metal reflector be tilted as is the glass parabolic reflector of Figure 7. The axis of the metal reflector of Figure 9 coincides with the axis 43 of the elliptical lens, and the inside face of the section 42 is placed at an angle on a line with the focus 44 of the system.

This design possesses the advantage of forming beams of light of varying spreads. These variations are obtained by placing the light source out of the focus of the system. If, for example, in moving the light source forward of the focus a wider spread but constantly uniform beam will result, as indicated by the dotted lines.

Figure 10 illustrates a slightly modified form of the lens shown in Figure 7. In this form, the lens body has a central elliptical lens section 45, a spherical cavity 46 in the rear face, and an annular ring 47 surrounding the elliptical lens section. This ring 47 has a parabolic surface 48 which does not, however, extend to the spherical cavity 46 as it does in the form shown in Figure 7. This parabolic surface 48 is connected with the spherical cavity 46 by a flat face 49 which is at right angles to the optical axis 50.

A metal parabolic reflector 51 provides a support for the lens and extends rearwardly of the focal point 52. In this form, the rays of light which originate at the focal point 52 and are reflected from the parabolic reflector, pass through the face 49 and then the inclined forward face 53 of the ring 47. This would cause the ring to act as a prism and give the rays of light an angular deviation away from the axis and to remedy this, the axis of the parabola is tilted toward the lens axis, as indicated at 54, so that the resulting rays are all parallel.

Figure 11 illustrates a further modification of the type of lens shown in Figure 7. Here the lens body is without a metallic reflector and formed on its forward face with an elliptical lens section 55, an annular ring 56 surrounding the lens section, the forward face 57 of which is inclined to the optical axis 58 and a rear spherical cavity 59. The outer margin of the body is formed in its forward portion as a parabolic section 60 and in its rear portion as a glass ring 61, the outer and inner surfaces 62 and 62ˣ of which are each spherical, but on different radii from different centers, making the rear portion of the glass ring an aspherical section.

Rays of light passing from the source of illumination at the focus impinge on the spherical face 62 which is provided with a reflecting coating, and such rays are reflected back along their original paths to the parabolic face 60 where they are reflected toward the inclined face 57 of the ring 56 and refracted into parallelism with the optical axis. The rays of light from the focus passing through the elliptical lens 55 are, of course, refracted into parallelism in the usual manner.

The inclined face 57 is tilted at an angle with the normal optical axis. Hence the parabolic surface 60 must be tilted down toward the axis, as previously explained and as indicated by the dotted line 64. The parabolic surface 60 is carried back to a point where it is directly opposite the focus and a line drawn from this point to the focus will make an angle of 90 degrees with the axis. The surfaces 62 and 62ˣ will serve to collect all the available light from the source. It covers an area of practically 40 degrees rearwardly from the end of the parabolic section 60.

This type of lens presents a combination of the aspherical, elliptical and parabolic surfaces in one unit and serves to focus the light without the aid of an additional metallic reflector.

Figure 12 shows the type of lens structure illustrated in Figure 4 and the type of spot illumination resulting from the beam of that lens. The spot illumination, illustrated at A in Figure 12, consists of three zones $a$, $b$ and $c$. The central zone $a$ is formed by the rays from the elliptical zone 22, the intermediate zone $b$ is formed from the light of the parabolic reflector, and the outer zone $c$ is formed by the scattered and uncontrolled light. Of course, while shown as distinct zones, the light rays merge into each other and form a field of illumination bright in the center and gradually diminishing toward the edge.

Figure 13 illustrates a spot illumination of the beam projected by the lens shown in Figure 7. This spot illumination illustrated at B at the right in Figure 13 discloses two zones $d$ and $e$. The central zone $d$ is a bright spot of light from the elliptical lens 30 while the zone $e$ is a ring of light resulting from the reflection of the parabolic reflector. The center zone $d$ is brighter than the center zone of Figure 12 for the reason that the elliptical lens 30 of the lens form shown in Figure 7 is closer to the source of light and therefore picks up a greater number of light rays and further that the light rays corresponding to the uncontrolled light ray area in Figure 12 are more or less focused to the central area $e$ of Figure 13, thus producing a more intense and concentrated beam from the form of lens shown in Figure 7 than from the form of lens shown in Figure 4.

Figure 14 shows a type of lens modified in structure from the form shown in Figures 4 or 7. The marginal surface of the lens 65 is parabolic at 66. The rear face of the lens body has a depression 67, the wall of which is cylindrical. The face of the lens has a central lens section 68, the surface of which is aspherical, that is any surface of revolution which will refract a pencil of rays but which is not part of a sphere. The annular surface 69 beyond the central lens section is inclined as is the surface 31 of the lens form shown in Figure 7, but the inclination of the surface 69 is less than that of the similar surface of the form shown in Figure 7 and does not lie in a plane with the focus of the lens.

In this form and to secure the desired result, the axis of the parabola is tilted as described in connection with the form shown in Figure 7 and also lowered below the lens axis, as indicated by the line 70—70. Obviously, by lowering and tilting the parabolic axis, a greater parabolic area may be enclosed in a given lens diameter, maintaining a higher efficiency in a small unit. By virtue of the relatively small angle of the face 69, the unit as a whole is more rugged, has fewer sharp angular edges, and the central lens section is required to be neither so large nor of such severe curvature as in the form shown in Figure 7. These changes result in the unit which is very much easier, comparatively speaking, to manufacture automatically without liability of breakage as compared with the form shown in Figure 7.

In this type of lens, light from the light source, in passing through the flat surface of a depression 67, picks up some spherical aberration which, however, is corrected by the aspherical surface of the central lens section 68. The light rays passing through the wall of the depression, moves in the direction as if they originated at a point below the light source, as indicated in dotted lines in Figure 14. There is in this a slight spherical aberration but which may be corrected by slightly altering the curvature of the edges of the parabolic surface 66. The paraxial rays are refracted both by the end surface of the depression 67 and the aspherical surface of the central lens section 68, these rays, by reason of these refractions, being projected into a parallel beam. If desired, a spherical mirror 71 in the rear of the depression may reflect rearwardly directed light rays. The marginal rays are reflected by the parabolic section to the inclined face 69 where they are slightly refracted into rays parallel with the normal axis.

Figure 15 shows a further modification of the lens type shown in Figures 4 and 7, with the form and proportion of the lens corresponding to that of Figure 14. In this Figure 15, the face of the lens presents an annular surface 72, corresponding to the surface 69 of the type shown in Figure 14, and a central lens surface 73 of elliptical type. The recess at the rear of the lens has a bottom surface 74 of aspherical type, the focus of the portion of the lens whose surfaces are 73 and 74 being at substantially the same point rearwardly as the normal focus of the lens as a whole. The annular wall 75 of the recess at the rear of the lens is on an aspherical curve, the focal point of which is lateral to the normal focus of the lens. The parabolic side faces 76 of the lens have their optical axis on the line 77 which includes the focal point of the aspherical surfaces 75.

In this type, the paraxial rays emanating from the light source are refracted by the lens surface 74 and continue as if they originated at the focal point of this lens surface, causing the rays to pass through the elliptical lens surface 73 beyond which they are projected parallel to the optical axis of the lens as a whole. The light rays engaging the aspherical surfaces 75 of the recess are refracted and are then directed as if they originated at the focal point in the optical axis of the parabolic surfaces. The light rays refracted by the surfaces 75 are reflected by the parabolic surfaces 76 and pass through the annular surface 72 of the face of the lens parallel to the optical axis of the lens. The provision of the convex lens faces 73 and 74 focus the paraxial beams in a more uniform manner than where a single elliptical lens is used. The light rays in this lens are free from spherical aberration under any light distribution. If desired and as contemplated, a spherical reflector 78 may be used in rear of the lens recess to gather the rearwardly directed rays from the light source.

In Figure 16 there is a slight modification in which the front surface 79 of the lens is plane, with the lens formed with a rear well or recess 80 in which the light source is positioned. The central lens surface defined by the surface of the bottom of the well or recess 80 is indicated at 81 and is a hyperboloidal type of curve. The annular wall 82 of the lens body is, generally speaking, of parabolic curve but strictly is not a true parabolic curve throughout, for as this surface approaches the optical axis, it is slightly flattened, providing a curvature more nearly approaching an elliptical form, as at 82$^x$.

In this Figure 16, the full lines in the upper portion of the figure represent the light rays when the light source is at the focal point of the lens, while in the lower half of the figure, the dotted lines represent the light ray projection when the focal point is forward of the normal focal point of the lens to insure beam spread. The light rays from the light source when at the normal focal point are refracted by the annular wall of the well or recess 80 and reflected from the surface 82 to form a parallel beam. The paraxial rays pass through the lens surface 81, are refracted by this surface, and projected parallel to the optical axis.

Rays from the light source which travel at an angle, which would otherwise avoid reflection by the surface 82, are refracted on entering the glass body of the lens and, incident to such refraction, reach the reflecting surface 82 and are projected into the light beam. When the light source is moved forward of the normal point of the lens system, the paraxial rays through the lens diverge while the rays from the reflecting surface 82 converge toward the normal optical axis and widen out. This would ordinarily tend to a somewhat non-uniform field though the hyperbolic lens 81 would naturally tend to a fairly uniform field of illumination. The non-uniformity of the beam noted would, incident to the use of a true parabolic reflector, cause a non-uniformity of the surface 82. By correcting this surface 82 to provide the part 82$^x$ adjacent the optical axis into a more or less elliptical form, the defect of non-uniformity of the beam is largely corrected.

Figure 17 shows the construction of the lens in Figure 16 with the dimensions marked in inches, the parts being marked in accordance with the reference numerals of Figure 16. The normal focus of the lens system is indicated at 83. The focal point indicated at 84 is the virtual focus of the light rays after entering the glass block, and this point 84 is also the focus of the parabolic reflecting surface 82.

In Figure 18 the lens body, indicated at 85, is similar in form generally to the lens body shown in Figure 16, to the extent of including a forward plane face 86, a light source receiving well 87 in the rear face, with the forward wall of the well formed as a central lens section 88 of hyperboloid curvature. The reflective margin 89 of the body is a parabola and self-reflective.

Incident to this type of lens, it has been found that the refractive action of the glass of the body of the lens on the marginal rays entering the annular wall of the well may be such that in their reflection from the reflective surface 89, there is a liability of the projected rays being out of parallelism with the optical axis with the result of creating a spherical aberration in the projected beam spot. The particular type of lens shown in Figure 18 is constructed with a view to controlling the refraction of the entering rays in such a manner that the effect of the refractive influence of the body on these rays will be varied to an extent such that the angle of reflection of said rays from the reflective margin 89 will direct such rays in substantial parallelism with the optical axis of the lens to avoid the spherical aberration heretofore referred to.

Figure 20:
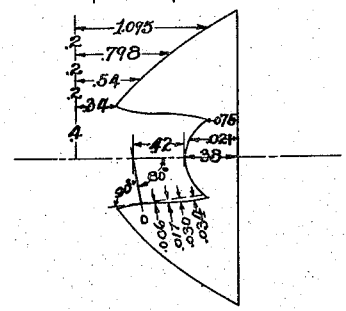
Figure 20 shows diagrammatically the detailed construction of the respective surfaces of the lens of Figure 18.

To correct this refractive influence, the annular wall of the well 87 is formed on what is definitely known as a fourth degree curve, that is to say, an irregular curve, the forward portion of which is concave and the rear portion of which is convex, the line of curvature being plotted, in the example illustrated, with the measurements indicated in Figure 20, to which the same reference numerals are applied as in Figure 18. The lens has a slightly longer focus than that shown in Figure 16 and the central lens 88 presents a single hyperboloid surface, the curvature of which does not have to be as severe as the lens 81 in Figure 16. The curved annular wall of the well described may be referred to as an aspherical curved surface which places the virtual focus just twice as far from the central lens as the real focus. If the central lens section is on the front face of the lens, as for example in Figure 14, the forward wall of the well, now shown flat in Figure 14, may, if desired, be formed on an irregular curve to correct spherical aberration of the paraxial rays. This irregular curve at the forward wall of the well could be used alone or in combination with the irregular curve of the annular wall of the well, as shown in Figure 18.

In Figure 18, it will be noted that there are certain rays, indicated at 90, which do not pass through the front surface 86 of the lens but are reflected back to the reflecting surface 89. These rays include those between the marginal and the paraxial rays and are totally reflected from the front face because their angle of incidence is greater than the critical angle. Otherwise the rays 90 would form striations or rings around the main beam.

Figure 19:
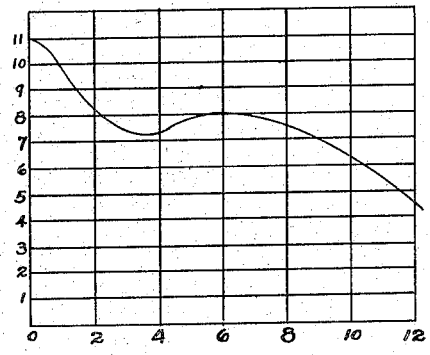
Figure 19 is a diagram illustrating the distribution of illumination from the improved lens.

Figure 19 shows diagrammatically the distribution of illumination at 10 feet distance from the lens when the light source is moved toward the lens to cause a divergent beam to illuminate a larger surface. This diagram shows the intensity of one-half the beam only, the other half being of course identical. It is to be noted that the diagram shows the high intensity in the center of the beam, despite the fact the light source is out of focus. The diagram is based upon a point focus of light and the fact that the lamp filament used in actual practice having appreciable dimensions will tend to make the illuminated field more even. The figures at the left hand side of the diagram indicate light intensity and the figures at the bottom of the diagram indicate beam spread.

Figure 21:
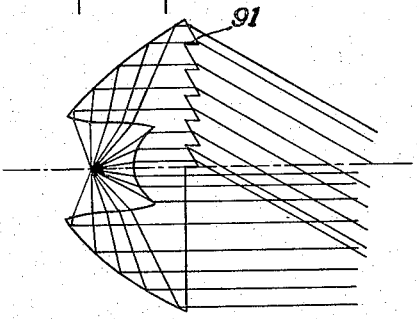
Figure 21 shows a lens constructed in accordance with Figure 18, with the addition of deflecting prisms for controlling the direction of a certain proportion of the rays of the beam, slightly modified.

In Figure 21 there is shown a slight modification of the lens of Figure 18 and insofar as the parts of the lens of Figure 21 are identical with the parts of the lens shown in Figure 18, the same reference numerals will be applied in order to avoid duplication. The modification in this particular lens shown in Figure 21 is the provision of deflecting prisms 91 on the upper half of the lens, which are parallel to a diameter of the lens body. The prisms may be on relatively different angles. In this form of lens, the light rays through the upper half of the lens are deflected downwardly, crossing the parallel beams through the central lens section and through the lower half of the lens, with such divergent or downwardly directed rays illuminating a different area from that of the parallel rays.

Figure 22:
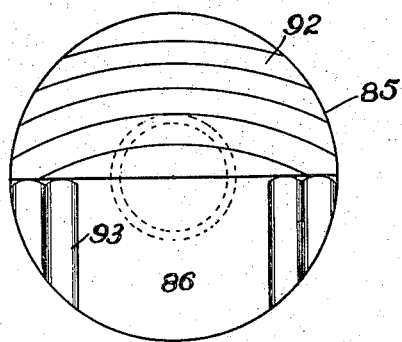
Figure 22 is a face view of the lens shown in Figure 21, slightly modified.

In Figure 22, the prisms indicated at 92 are curved, with their angles of different degree. The prisms are on the upper half of the face of the lens and vertical flutings 93 are on the lower half. If the light is to be concentrated in a small spot, prisms 92 may be curved downwardly, while if the beam is to be spread, the prisms may be concaved upwardly. The flutings of the lower half of the lens spread the beam laterally.

This type of lens, as shown in Figure 21, may be particularly serviceable in connection with automobile headlights and the like where the parallel rays of the beam light up the roadway in advance of the vehicle while the deflected rays from the prisms illuminate the road-bed immediately in advance of the automobile. Of course, in this type if the light source is moved out of focus to produce a divergent beam, the parallel light rays and also the downwardly directed light rays from the prisms are rendered equally divergent in their illuminating effect to increase the spread of the beam from each set of rays.

Figure 23:
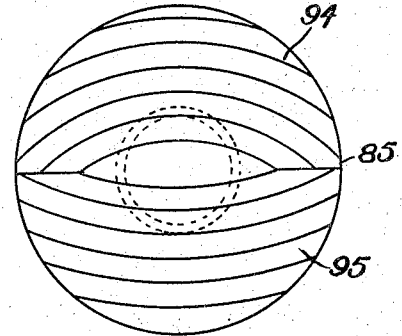
Figure 23 is a face view of a lens showing a further modification of the forward face.

Figure 23 is a slight modification of the form shown in Figure 21, wherein, in addition to the upper prisms 93 identical with the prisms 92 of the form shown in Figure 22, and indicated at 94, a lower set of prisms 95 are also provided, rendering the forward face of the lens body substantially of prismatic form. The upper set of prisms 94 will, of course, direct the rays of the beam downwardly to focus the beam below the optical axis of the lens. The second set of prisms 95 are contemplated to be formed to direct the lower half of the beam in a direction divergent from the rays of the upper half of the beam, either up or down. If the beam is refracted downwardly, the prismatic curvatures will tend to diverge the beam and make it spread over a considerable area.

While a detailed portrayal has been given of some of the forms the invention may take, in its optical characteristics, it is not intended to limit the invention to the above description. The nature of the invention is such that it may be applied in connection with a multitude of different uses. The invention may be used in connection with a multitude of different lanterns, spotlights, headlights or any other type of light projectors. Optical closures may be used or made of glass or any other transparent material. Various modifications, changes or rearrangements of parts may be made, for instance—changes in angles or curvatures of the optical lens—in order to vary the light distribution or any other such alterations, without departing from the spirit of the invention and the scope of the appended claims.

What is claimed to be new is:

1. A unitary lens body having a parabolic outer margin, the axis of revolution of the parabolic generatrix being tilted with respect to the normal axis of the lens body, the forward face of the body being formed as a central elliptical lens section, and an inclined annular margin between the central lens section and the parabolic surface, the inclination of the annular margin being on a plane passing through the normal focal point of the lens.

2. In a lens unit for projecting parallel beams of light when the light source is at the focal point of the unit, a unitary lens body having a spherical light receiving well in the rear of said lens body, a forward diverging parabolic surface extending from the perimeter of said lens wall, the axis of revolution of the parabolic generatrix of said surface being inclined with respect to the normal axis of the lens unit, a central elliptical lens section on the forward face of said lens body and an inclined marginal area around the central lens section, the inclination of said margin being on a plane passing through the normal focal point of the lens.

3. In a lens unit for projecting parallel beams of light when the light source is at the focal point of the unit, a unitary lens body having an outer reflective parabolic surface, the axis of revolution of the parabolic surface being inclined with respect to the normal axis of the lens unit, a central elliptical lens section on the forward face, the focal point of said forward lens section and the parabolic margins being coincidental, an inclined marginal area around the central lens section, the inclination of said marginal area being on a plane passing through the focal points of the parabolic surface and the central lens section, a spherical light receiving well having walls equidistant at all points from the coincidental focal points of the parabolic margins and the central lens section.

4. A unitary optical lens including a body having an outer reflective parabolic surface, a central lens system of substantially aspherical surface, and an inclined marginal area beyond the central lens system, the parabolic surface being positioned in accordance with the inclination of the marginal area to produce marginal rays parallel to the axis of the lens.

5. A unitary lens body having a parabolic outer surface, the axis of revolution of the parabolic generatrix being tilted with respect to the normal axis of the lens body, the forward face of the body being formed as a central lens section, and an inclined annular margin between the central lens section and the parabolic surface, the annular margin being inclined in accordance with the tilting of the generatrix of the parabolic surface.

6. A construction as defined in claim 4, wherein the lens body is formed with a well having a marginal surface formed as two spherical surfaces on different radii from different centers.

7. A construction as defined in claim 4, wherein the lens body has a spherical cavity in the rear face of such body, the normal focal point of the lens being within the spherical cavity.

8. A unitary integral optical lens for projecting parallel beams of light, including a body of outer reflective surface of substantially parabolic curvature, a central lens system of substantially aspherical surface, and a marginal area around the lens system, a light source receiving well in rear of said lens, the generative axis of the parabolic surface being inclined with respect to the normal axis of the lens as a whole, the parabolic surface being so modified with respect to the marginal area as to produce rays parallel to the axis of the lens.

9. A construction as defined in claim 8, wherein the rear end of the parabolic surface is in a plane at right angles to the optical axis and passes through the normal focal point of the lens.

10. A construction as defined in claim 4, wherein the rear face of the lens body is formed with a spherical well within which is located the focal point of the lens proper, the diameter of the well being equal to the minor diameter of the central lens system.

LAWRENCE HARRIS.